(12) United States Patent
Bremer

(10) Patent No.: US 6,241,163 B1
(45) Date of Patent: Jun. 5, 2001

(54) WATER INJECTING SYSTEM

(76) Inventor: Artie J. Bremer, 3874 Longview Dr., Chamblee, GA (US) 30341

( * ) Notice: Subject to any disclaimer, the term of this patent is extended or adjusted under 35 U.S.C. 154(b) by 0 days.

(21) Appl. No.: 09/528,222

(22) Filed: Mar. 17, 2000

(51) Int. Cl.$^7$ .............................. A01C 23/02; A01G 29/00
(52) U.S. Cl. ........................ 239/271; 239/276; 47/48.5; 111/7.1
(58) Field of Search .................... 239/276, 273, 239/271; 47/48.5; 111/7.1

(56) References Cited

U.S. PATENT DOCUMENTS

| | | | | |
|---|---|---|---|---|
| 749,758 | * | 1/1904 | Templeton | 111/7.1 |
| 1,175,593 | * | 3/1916 | Brown | 111/7.1 |
| 1,601,778 | * | 10/1926 | Stauffer | 239/271 |
| 1,755,445 | * | 4/1930 | Irish | 111/7.1 |
| 1,937,172 | * | 11/1933 | Starner et al. | 111/7.1 |
| 1,964,064 | * | 6/1934 | Karshner | 111/7.1 |
| 2,018,003 | * | 10/1935 | Axtell | 111/7.1 |
| 2,027,005 | * | 1/1936 | Tatroe | 111/7.1 |
| 2,306,165 | * | 12/1942 | Irish | 111/7.1 |
| 2,505,174 | * | 4/1950 | Daniels | 239/271 |
| 2,850,992 | * | 9/1958 | Hooper et al. | 47/48.5 |
| 2,875,713 | * | 3/1959 | Shoffner | 47/48.5 |
| 2,893,334 | * | 7/1959 | Snyder | 239/271 |
| 3,288,091 | * | 11/1966 | Cortello | 111/7.1 |
| 4,705,218 | * | 11/1987 | Daniels | 239/271 |
| 5,398,445 | * | 3/1995 | Lemons | 47/48.5 |
| 5,618,000 | * | 4/1997 | Lantzy et al. | 239/276 |
| 5,671,887 | * | 9/1997 | Invarone | 47/48.5 |
| 5,694,716 | * | 12/1997 | Bible | 47/48.5 |

\* cited by examiner

*Primary Examiner*—Lesley D. Morris

(57) ABSTRACT

A water injecting system for injecting water into the soil. The water injecting system includes a first member for inserting into the ground surface and a second member for coupling to the first member. The first member has a substantially hollow first tube having a first end and a second end. The first end has a substantially conical shape, and the first tube has slits therein. A second hollow tube has a first end and a second end. The first end of the tube is fluidly connected to the second end of the first tube. The second member delivers water to the first member. The second member has a substantially hollow third tube having a first end and a second end. The first end of the third tube is fluidly connected to the second end of the third tube. The third tube is adapted for coupling to a female portion of a garden hose.

10 Claims, 2 Drawing Sheets

WATER INJECTING SYSTEM

BACKGROUND OF THE INVENTION

1. Field of the Invention

The present invention relates to watering apparatuses and more particularly pertains to a new water injecting system for injecting water into the soil.

2. Description of the Prior Art

The use of watering apparatuses is known in the prior art. More specifically, watering apparatuses heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. Nos. 5,698,716; 5,618,000; 3,916,564; 5,398,445; 5,671,887; and U.S. Pat. No. 389,705.

While these devices fulfill their respective, particular objectives and requirements, the aforementioned patents do not disclose a new water injecting system. The inventive device includes a first member for inserting into the ground surface and a second member for coupling to the first member. The first member has a substantially hollow first tube having a first end and a second end. The first end has a substantially conical shape, and the first tube has slits therein. A second hollow tube has a first end and a second end. The first end of the tube is fluidly connected to the second end of the first tube. The second member delivers water to the first member. The second member has a substantially hollow third tube having a first end and a second end. The first end of the third tube is fluidly connected to the second end of the third tube. The third tube is adapted for coupling to a female portion of a garden hose.

In these respects, the water injecting system according to the present invention substantially departs from the conventional concepts and designs of the prior art, and in so doing provides an apparatus primarily developed for the purpose of injecting water into the soil.

SUMMARY OF THE INVENTION

In view of the foregoing disadvantages inherent in the known types of watering apparatuses now present in the prior art, the present invention provides a new water injecting system construction wherein the same can be utilized for injecting water into the soil.

The general purpose of the present invention, which will be described subsequently in greater detail, is to provide a new water injecting system apparatus and method which has many of the advantages of the watering apparatuses mentioned heretofore and many novel features that result in a new water injecting system which is not anticipated, rendered obvious, suggested, or even implied by any of the prior art watering apparatuses, either alone or in any combination thereof.

To attain this, the present invention generally comprises a first member for inserting into the ground surface and a second member for coupling to the first member. The first member has a substantially hollow first tube having a first end and a second end. The first end has a substantially conical shape, and the first tube has slits therein. A second hollow tube has a first end and a second end. The first end of the tube is fluidly connected to the second end of the first tube. The second member delivers water to the first member. The second member has a substantially hollow third tube having a first end and a second end. The first end of the third tube is fluidly connected to the second end of the third tube. The third tube is adapted for coupling to a female portion of a garden hose.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new water injecting system apparatus and method which has many of the advantages of the watering apparatuses mentioned heretofore and many novel features that result in a new water injecting system which is not anticipated, rendered obvious, suggested, or even implied by any of the prior art watering apparatuses, either alone or in any combination thereof.

It is another object of the present invention to provide a new water injecting system which may be easily and efficiently manufactured and marketed.

It is a further object of the present invention to provide a new water injecting system which is of a durable and reliable construction.

An even further object of the present invention is to provide a new water injecting system which is susceptible of a low cost of manufacture with regard to both materials and labor, and which accordingly is then susceptible of low prices of sale to the consuming public, thereby making such water injecting system economically available to the buying public.

Still yet another object of the present invention is to provide a new water injecting system which provides in the apparatuses and methods of the prior art some of the advantages thereof, while simultaneously overcoming some of the disadvantages normally associated therewith.

Still another object of the present invention is to provide a new water injecting system for injecting water into the soil.

Yet another object of the present invention is to provide a new water injecting system which includes a first member for inserting into the ground surface and a second member for coupling to the first member. The first member has a substantially hollow first tube having a first end and a second end. The first end has a substantially conical shape, and the first tube has slits therein. A second hollow tube has a first end and a second end. The first end of the tube is fluidly connected to the second end of the first tube. The second member delivers water to the first member. The second member has a substantially hollow third tube having a first end and a second end. The first end of the third tube is fluidly connected to the second end of the third tube. The third tube is adapted for coupling to a female portion of a garden hose.

Still yet another object of the present invention is to provide a new water injecting system that can be used to water both below and above the surface.

Even still another object of the present invention is to provide a new water injecting system that can be used for killing insect populations.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
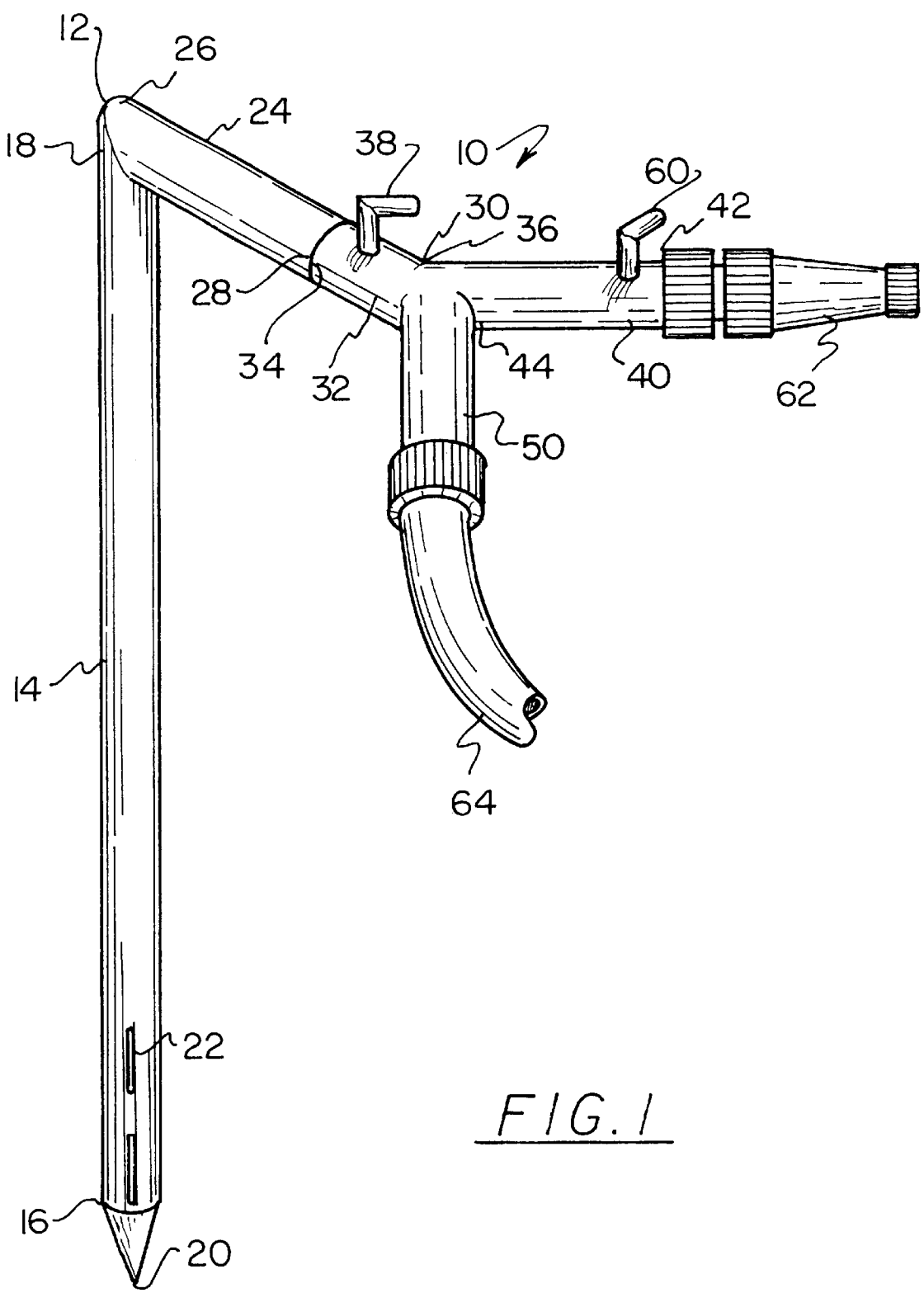
FIG. 1 is a schematic perspective view of a new water injecting system according to the present invention.
Figure 2:
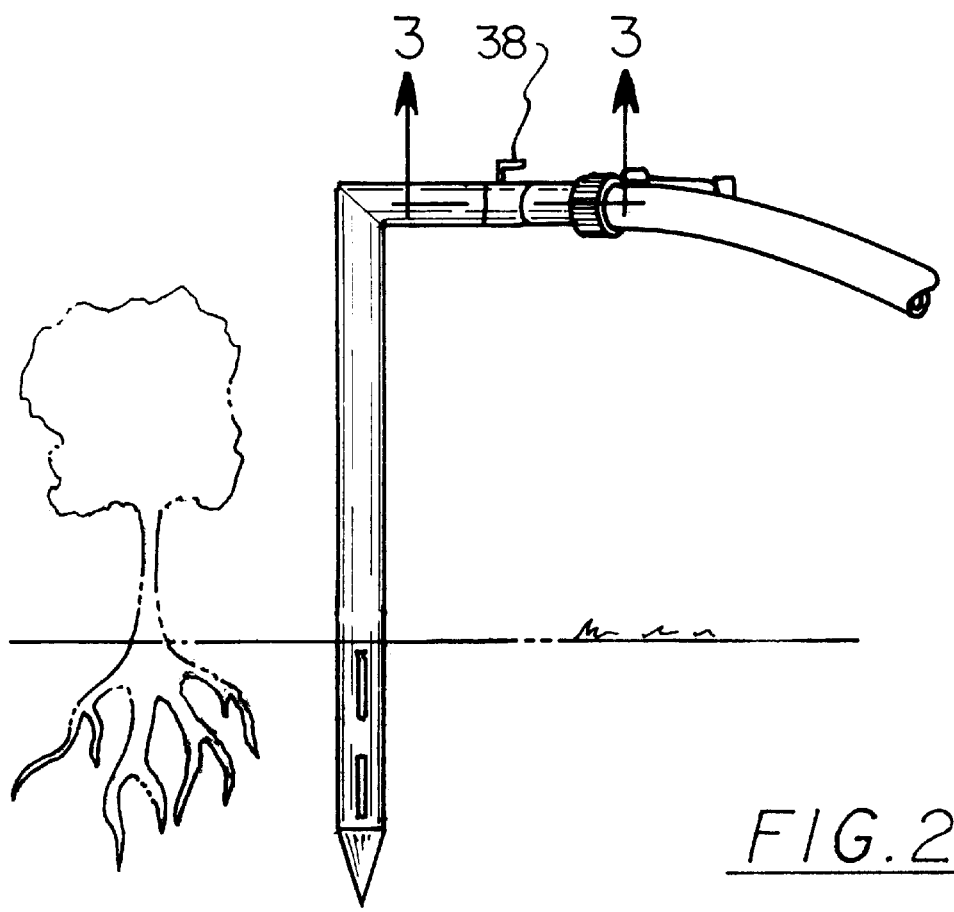
FIG. 2 is a schematic perspective view of the present invention inserted into the ground.
Figure 3:
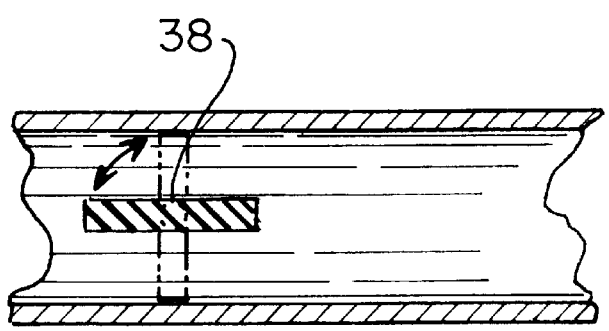
FIG. 3 is a schematic cross-section view taken along line 3—3 of the valve of the present invention.

With reference now to the drawings, and in particular to FIGS. 1 through 3 thereof, a new water injecting system embodying the principles and concepts of the present invention and generally designated by the reference numeral 10 will be described.

As best illustrated in FIGS. 1 through 3, the water injecting system 10 generally comprises a first member 12 for inserting into the ground surface and a second member 30 coupled to the first member.

The first member 12 has a first tube 14. The first tube 14 is substantially hollow and has a first end 16 and a second end 18. The first end 16 has a substantially conical shape, preferably terminating in a pointed tip 20. The first tube has slits 22 therein. The slits 22 are preferably located generally adjacent to the first end 16 of the first tube 14. The slits are ideally oriented along the longitudinal axis of the first tube 14. Insertion of the first end 16 of the first tube 14 in the ground surface orients the first tube generally vertical to the ground surface.

A second hollow tube 24 has a first end 26 and a second end 28. The first end 26 of the second tube 24 is fluidly connected to the second end 18 of the first tube 14. Preferably, the second tube 24 has a longitudinal axis oriented generally perpendicular a longitudinal axis of the first tube 14.

The second member 30 has a third tube 32. The third tube 32 is substantially hollow and has a first end 34 and a second end 36. The first end 34 of the third tube is fluidly connected to the second end 28 of the second tube 24.

A first valve 38 for controlling water flow through the third tube 32 is in the third tube. The valve 38 is located generally adjacent to the second tube 24.

A fourth tube 40 and a fifth 50 tube are each substantially hollow and each has a first end 44 and second end 42. Preferably, the first ends 44 of the fourth and fifth tubes are fluidly connected to a second end 36 of the third tube 30 such that a juncture of the third, the fourth and the fifth tubes form a substantially "Y" shaped juncture. The second ends 42 of the fourth 40 and fifth 50 tubes are adapted to receive a female portion of a garden hose.

Preferably, a second valve 60 for controlling water flow through the fourth tube is in the fourth tube 40. The second valve 60 is located generally adjacent to a second end 42 of the fourth tube 40.

Ideally, a nozzle 62 is releasably coupled to an open end of the fourth tube 42.

In use, the first end 16 of the first tube is inserted into the ground. A hose 64 is hooked up to the second end 44 of the fifth tube 50. The water is turned on which sends water through the fifth tube 50. If the second valve 60 is open, water will enter the fourth tube 40 and leave through its second end 42. If the first valve 38 is open, water will enter the first tube 14 and exit through the slits 22 and go into the ground. This places water adjacent to and surrounding the roots of plants. The first end 16 can also be inserted into insect lairs such as anthills. Hot water can be sent into the lairs via the slot to kill the insects.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A device for injecting water into a ground surface, said device comprising:
   a first member for inserting into the ground surface, comprising:
   a first tube, said first tube being substantially hollow, said first tube having a first end and a second end, said first end having a substantially conical shape, said first tube having slits therein;
   a second tube, said second tube being hollow, said second tube having a first end and a second end, said first end of said second tube being fluidly connected to said second end of said first tube;
   a second member for delivering water to said first member, comprising:
   a third tube, said third tube being substantially hollow, said third tube having a first end and a second end, said first end of said third tube being fluidly connected to said second end of said second tube; and
   wherein said third tube is adapted for coupling to a female portion of a garden hose;

a first valve for controlling water flow through said third tube, said first valve being located on said third tube, aid valve being located generally adjacent to said second tube; and a fourth tube and a fifth tube, said fourth and fifth tubes each being substantially hollow, said fourth and fifth tubes each having a first end and second end, said first ends of said fourth and fifth tubes being fluidly connected to a second end of said third tube such that a juncture of said third, said fourth and said fifth tubes forms a substantially "Y" shaped juncture, said second ends of said fourth and fifth tubes being adapted to be received in a female portion of a garden hose.

2. The device for injecting water into a ground surface as in claim 1, wherein said first end of said first tube terminates in a pointed tip, said slits being located generally adjacent to said first end of said first tube, said slits being oriented along the longitudinal axis of said tube, wherein insertion of said first end of said first tube in said ground surface orients said first tube generally vertical to said ground surface.

3. The device for injecting water into a ground surface as in claim 2, wherein said second tube has a longitudinal axis oriented generally perpendicular a longitudinal axis of said first tube.

4. The device for injecting water into a ground surface as in claim 1, further comprising:

a nozzle releasably coupled to an open end of said fourth tube.

5. A device for injecting water into a ground surface, said device comprising:

a first member for inserting into the ground surface, comprising:

a first tube, said first tube being substantially hollow, said first tube having a first end and a second end, said first end having a substantially conical shape, said first end terminating in a pointed tip, said first tube having slits therein, said slits being located generally adjacent to said first end of said first tube, said slits being oriented along the longitudinal axis of said tube, wherein insertion of said first end of said first tube in said ground surface orients said first tube generally vertical to said ground surface;

a second tube, said second tube being hollow, said second tube having a first end and a second end, said first end of said second tube being fluidly connected to said second end of said first tube, said second tube having a longitudinal axis oriented generally perpendicular a longitudinal axis of said first tube;

a second member for delivering water to said first member, comprising:

a third tube, said third tube being substantially hollow, said third tube having a first end and a second end, said first end of said third tube being fluidly connected to said second end of said second tube;

a first valve for controlling water flow through said third tube, said first valve being in said third tube, said valve being located generally adjacent to said second tube;

a fourth tube and a fifth tube, said fourth and fifth tubes each being substantially hollow, said fourth and fifth tubes each having a first end and second end, said first ends of said fourth and fifth tubes being fluidly connected to a second end of said third tube such that a juncture of said third, said fourth and said fifth tubes forms a substantially "Y" shaped juncture, said second ends of said fourth and fifth tubes being adapted to receive a female portion of a garden hose;

a second valve for controlling water flow through said fourth tube, said second valve being in said fourth tube, said second valve being located generally adjacent to a second end of said fourth tube; and a nozzle, said nozzle being releasably coupled to an open end of said fourth tube.

6. A device for injecting water into a ground surface, said device comprising:

a first member for inserting into the ground surface, comprising:

a first tube, said first tube being substantially hollow, said first tube having a first end and a second end, said first end having a substantially conical shape, said first tube having slits therein;

a second tube, said second tube being hollow, said second tube having a first end and a second end, said first end of said second tube being fluidly connected to said second end of said first tube;

a second member for delivering water to said first member, comprising:

a third tube, said third tube being substantially hollow, said third tube having a first end and a second end, said first end of said third tube being fluidly connected to said second end of said second tube; and wherein said third tube is adapted for coupling to a female portion of a garden hose; and a fourth tube and a fifth tube, said fourth and fifth tubes each being substantially hollow, said fourth and fifth tubes each having a first end and second end, said first ends of said fourth and fifth tubes being fluidly connected to a second end of said third tube such that a juncture of said third, said fourth and said fifth tubes forms a substantially "Y" shaped juncture, said second ends of said fourth and fifth tubes being adapted to receive a female portion of a garden hose.

7. The device for injecting water into a ground surface as in claim 6, further comprising a first valve for controlling water flow through said third tube, said first valve being in said third tube, said valve being located generally adjacent to said second tube.

8. The device for injecting water into a ground surface as in claim 6, further comprising a second valve for controlling water flow through said fourth tube, said second valve being located on said fourth valve.

9. The device for injecting water into a ground surface as in claim 6, wherein said first end of said first tube terminates in a pointed tip, said slits being located generally adjacent to said first end of said first tube, said slits being oriented along the longitudinal axis of said tube, wherein insertion of said first end of said first tube in said ground surface orients said first tube generally vertical to said ground surface.

10. The device for injecting water into a ground surface as in claim 6, wherein said second tube has a longitudinal axis oriented generally perpendicular a longitudinal axis of said first tube.

* * * * *